Jan. 7, 1936.                T. M. TOWNE                2,027,130
                          INSPECTION LENS
                         Filed Sept. 5, 1933
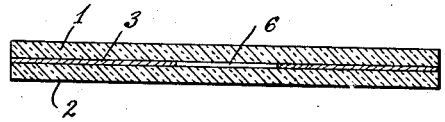
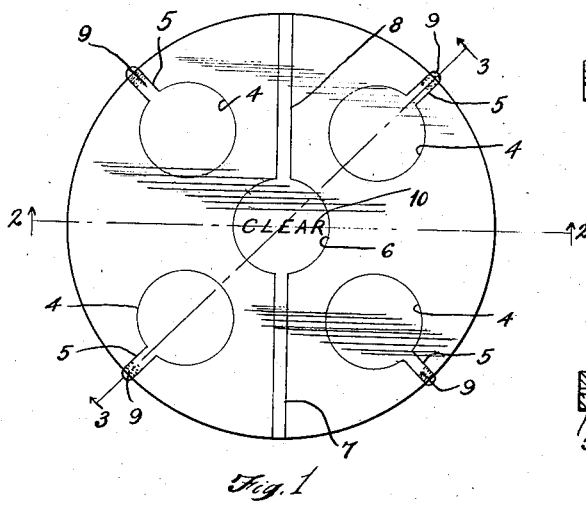
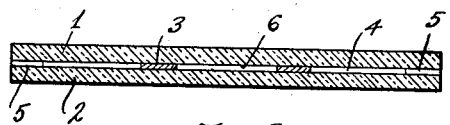
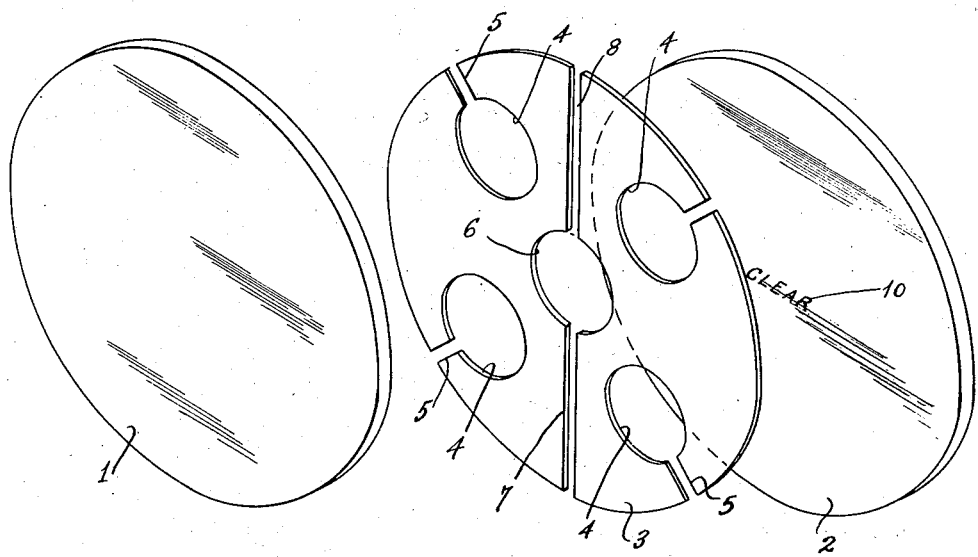
INVENTOR.
Thomas M. Towne
BY
Ray, Oberlin & Ray
ATTORNEYS.

Patented Jan. 7, 1936

2,027,130

UNITED STATES PATENT OFFICE 2,027,130

INSPECTION LENS

Thomas M. Towne, Parma, Ohio

Application September 5, 1933, Serial No. 688,138

2 Claims. (Cl. 88—14)

The present invention relates to a transparent element which is particularly adapted for use in a device for inspecting and comparing lubricants. More precisely my invention relates to a "lens" in the body of which are contained permanent quantities of lubricants of varying degrees of contamination together with a cavity or chamber in such lens into which the lubricant to be inspected may be temporarily injected and withdrawn.

It is the general object and nature of my invention to provide such an inspection lens which can be cheaply and quickly manufactured, and one which may be readily installed in a lubricant extracting device or in a lubricant circulating system.

It is a further object of the invention to provide a transparent panel which will display a sample of lubricant in a thin film in order to permit the greater penetration of light and consequently to enable a closer and more definite apprehension of the occluded particles of contamination.

To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

In said annexed drawing:

Fig. 1 is a plan view of the assembled lens embodying the principle of my invention; Fig. 2 is a section taken substantially upon the line 2—2 of Fig. 1; Fig. 3 is a section taken substantially upon the line 3—3 of Fig. 1; Fig. 4 is a perspective view of the component elements of the lens in disassembled position.

In order to insure the proper lubrication of a mechanism such as an internal combustion engine, it is a well known fact that the lubricant used therein must be drained off and renewed after a certain amount of usage. Such usage can be determined by a definite ruled thumb as to the hours of operation of the engine or a certain number of miles of driving of a vehicle. Varying conditions of operation such as those of speed, temperature, and load may demand that the lubricant be changed in an internal combustion engine vehicle anywhere from between 500 to 3,000 miles of operation. The most reliable method of determining the point at which such a lubricant change is necessary is that of testing the degree of contamination of the lubricant. Consequently, my invention has been conceived for the purpose of displaying a lubricant to be tested in such a manner as to readily and indefinitely indicate the amount and degree of foreign particles which have become picked up and suspended in the lubricant body.

Now referring more particularly to the drawing, my inspection lens, which in the present embodiment is shown in a circular form, although it may assume other conformations such as that of a square or octagon or the like, consists essentially of the two outer members 1 and 2 and the interior plate 3. The outside members 1 and 2 are preferably composed of a material such as glass. The interior member 3 is composed of a material such as celluloid. A plurality of openings 4 are cut out of the body portion of the interior member 3. Channels 5 lead from the cut-away portions 4 to the edge of the lens. It will be noted that the cut-away portions 4 are substantially placed in a circular line about the body of the lens. Another cut-away portion 6 is positioned in the center of the member 3. Channels 7 and 8 serve as a double conduit placing the interior of the opening 6 in communication with the outer edges of the lens. The two outer members 1 and 2 and the interior member 3 are then assembled, as shown in Figs. 1 to 3 inclusive, in permanently secured relationship by means of a suitable cement or may be fused together by means of the application of heat and pressure, as in the manufacture of the well-known "tri-plate" safety glass. Lubricants of varying degrees of contamination are then introduced into the cut-away portions 4, which now have become interior cavities in the lens, through the channels 5.

It is also contemplated that instead of placing lubricant samples themselves in the cavities 4, that representations thereof such as petroleum jelly or a linseed oil containing aniline dies be substituted. This is for the reason that the suspended foreign particles of contamination in a lubricant settle out after a certain period of time. Hence an artificial representation of a contaminated lubricant sample, as just indicated, in which the vehicle carrying the suspended particles is congealed, is found to be more durable and permanent. After such lubricant has been introduced into the cavities 4, the outer ends of the channels 5 are sealed as at 9 by means of a suitable cement, the lubricants thereby being permanently retained in the body of the lens.

The channels 7 and 8 leading to the cavity 6 are left open in order that a lubricant to be inspected may be injected and ejected from such cavity by means of a suction imposed upon either one of the conduits 7 or 8, or by means of a forced circulation through such channels and cavity.

Rather than comparing the degree of contamination with the lubricant which is drawn or forced into the cavity 6 with that of the permanent samples in the cavities 4, the construction may be modified whereby the cavities 4 are eliminated and a word or trade name such as indicated by the reference numeral 10 may be etched on the outer wall of the member 2 in registry with the cavity 6. Thus when the sampled lubricant is drawn or circulated through the cavity 6 and possesses so great an amount of contamination that the word etched on the face of the member 2 is no longer visible or legible, then the operator is advised that the maximum contamination point has been reached.

It will thus be seen that my foregoing invention provides a lubricant inspection lens which may be very cheaply and easily fabricated. It is extremely light in weight and is capable of permanently displaying a plurality of lubricant samples in a minimum amount of space.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In an article of the character described, the combination of transparent members having opposed flat surfaces, an intermediate plate like member positioned between said transparent members, all of said members having their mutually contacting faces permanently bonded to each other, said plate like member having a plurality of openings therein and also having slots extending from said openings to its outer periphery, the surfaces of said transparent members and the edges of said openings and of said slots forming enclosed cavities and conduits communicating with the outer edge of said article.

2. In an article of the character described, the combination of transparent members having opposed flat surfaces, an intermediate plate like member positioned between said transparent members, all of said members having their mutually contacting faces permanently bonded to each other, said plate like member having a plurality of openings therein and also having slots extending from said openings to its outer periphery, the surface of said transparent members and the edges of said openings and of said slots forming enclosed cavities and conduits communicating with the outer edge of said article, and means for sealing the outer ends of selected slots.

THOMAS M. TOWNE.